US008294919B2

(12) United States Patent
Bakker et al.

(10) Patent No.: US 8,294,919 B2
(45) Date of Patent: Oct. 23, 2012

(54) ENDORSEMENT PRINTING BY BUILDING CHARACTERS

(75) Inventors: Johan P. Bakker, Brighton, MI (US); J. Michael Spall, Oakland, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 935 days.

(21) Appl. No.: 12/319,059

(22) Filed: Dec. 31, 2008

(65) Prior Publication Data

US 2010/0165372 A1 Jul. 1, 2010

(51) Int. Cl.
*G06K 15/00* (2006.01)
*G06K 9/00* (2006.01)

(52) U.S. Cl. ...................................... 358/1.14; 382/137

(58) Field of Classification Search .................. 235/379, 235/454; 271/3.03, 3.05
See application file for complete search history.

(56) References Cited

U.S. PATENT DOCUMENTS

| | | | | |
|---|---|---|---|---|
| 6,017,161 | A * | 1/2000 | Harris et al. | 400/625 |
| 6,103,985 | A * | 8/2000 | Shell et al. | 209/587 |
| 6,257,783 | B1 * | 7/2001 | Hanaoka et al. | 400/578 |
| 7,128,260 | B1 * | 10/2006 | Updike et al. | 235/379 |
| 7,216,801 | B1 * | 5/2007 | Crews et al. | 235/379 |
| 7,258,500 | B2 * | 8/2007 | Furihata et al. | 400/188 |
| 7,486,421 | B2 * | 2/2009 | Yang | 358/474 |
| 7,810,714 | B2 * | 10/2010 | Murata | 235/379 |
| 8,098,391 | B2 * | 1/2012 | Kiplinger et al. | 358/1.15 |
| 2005/0127182 | A1 * | 6/2005 | Nagata et al. | 235/454 |
| 2010/0014743 | A1 * | 1/2010 | Spall | 382/139 |
| 2010/0166288 | A1 * | 7/2010 | Spall et al. | 382/137 |

* cited by examiner

*Primary Examiner* — Gabriel Garcia
(74) *Attorney, Agent, or Firm* — Honigman Miller Schwartz and Cohn LLP

(57) ABSTRACT

A document processor receives a document to be processed and captures data from the document. The document processor includes a plurality of processing devices and conveys documents past the plurality of processing devices to allow the processing devices to perform operations on the documents. A programmable endorser prints an endorsement on a document as the document is processed. The programmable endorser includes a plurality of character segments in the form of various shapes such that the endorsement is printed by building characters from the character segments.

24 Claims, 2 Drawing Sheets

ENDORSEMENT PRINTING BY BUILDING CHARACTERS

BACKGROUND OF THE INVENTION

1. Field of the Invention

The invention relates to document processing, and to compact, desktop document processors for capturing data and images from checks and other financial and payment-related documents. The invention further relates to document processors designed for processing documents at a teller window.

2. Background Art

Historically, banks processed large volumes of paper checks in centralized locations, either a central bank or a clearing house. Document processing machines in such locations were large, processing up to 2000 documents per minute. These machines were supported by dedicated, trained operators.

However, centralized processing costs banks typically three days in clearing a document. The "Check Clearing for the 21st Century Act" or the "Check 21 Act" was enacted by Congress to facilitate check truncation by authorizing substitute checks, to foster innovation in the check collection system without mandating receipt of checks in electronic form, and to improve the overall efficiency of the Nation's payments system. The Check 21 legislation has driven the demand for decentralized check imagers and sorters in financial institutions. Check 21 gives equal legal validity to electronic data obtained from documents, and has made it possible for banks to distribute document processing to speed the clearing process. Check 21 has made it advantageous for banks to convert paper checks to electronic data as early as possible.

In the recent past, banks have partially converted paper check information to electronic data. In some cases this partial information was used internally. In other cases two banks would agree on standards for electronic data transfer. In either case, the paper check was still the only legal document for the transaction. Check 21 has standardized these agreements across the banking industry, and given the electronic data legal merit, if the electronic data meet the requirements set forth in Check 21.

Accordingly, Check 21 has led to a rapid expansion of check-processing solutions based upon interchange of electronic images rather than paper checks, and with this there has been a flood of smaller, cheaper check-processing devices which all have the aim of capturing check images ever-more-early in the payment transaction. This process, known as truncation, aims to remove the physical paper check from the process of payment clearing as quickly as possible—ideally, at the point of presentment (cashier station, merchant counter, etc.). Because it is advantageous for banks to convert paper checks to Check 21 valid electronic data as early as possible, compact, desktop document processors have been developed. Some of these payment system devices are designed for use on a counter top, or at a teller window.

As these processing solutions have become smaller and cheaper, the process of endorsement has become more and more problematic. Everyone associated with a check-clearing transaction wants to place an endorsement on the rear of the check—typically, an alphanumeric imprint which records when, where, and by whom the check was accepted—and they want this endorsement to be placed on the check early enough that it is captured into check images which form part of the truncation process. But the means for applying such an endorsement which is selectable and programmable have become (proportionally) more and more costly relative to the total cost of the check processing machine, to the point where the endorsement means may increase the cost of the machine above what the market can bear. The relative size of conventional endorsement means has also become more and more problematic as check-processing machines become ever-smaller.

The conventional approach to endorsing checks for at least the last 30 years has been inkjet printing. This process has been very apt for endorsing because of its high speed and relatively low cost, and the lack of any practical alternative. However, as check-processing solutions become smaller and cheaper, and as speed becomes less important, inkjet printing becomes less and less attractive. For example, an inkjet printer may well be capable of operating at equivalent paper speeds of 100 inches-per-second or more—but this capacity is mostly wasted when applied in a machine which is only required to operate at equivalent paper speeds of 15 inches-per-second.

A further disincentive to inkjet printing in smaller, slower and cheaper machines is the prevalent business model by which inkjet printing means are marketed. Since the technology of inkjet printing is so complex and the barriers to development so high, inkjet printers tend to be based around proprietary and patent-protected cartridge-based designs, in which as much of the complex technology as possible is embedded. This allows the makers to charge very high prices for replacement cartridges, and leads to a classic razor-blade type business approach, in which the printer mechanism is very cheap, but the replacement cartridges required to make it function are very costly. This places a very high cost-of-ownership on an inkjet endorsing solution in a small, cheap and slow check-processing machine, since a replacement inkjet cartridge may well cost more than the entire machine.

For the foregoing reasons, there is a need for an approach to providing a low-cost programmable endorsement on checks without the use of inkjet printing means.

SUMMARY OF THE INVENTION

In one embodiment, an apparatus for capturing data from checks and other financial and payment-related documents is provided. The apparatus comprises a compact, desktop document processor base unit including an input slot for receiving a check to be processed. A transport stage is located within the base unit. The transport stage includes a plurality of processing devices, and conveys documents past the plurality of processing devices. The processing devices perform operations on the documents. The transport stage receives a document in the input slot, and routes the document past the plurality of processing devices.

The plurality of processing devices includes a programmable endorser for printing an endorsement on a document as the document is processed. The programmable endorser includes a plurality of character segments in the form of various shapes such that the endorsement is printed by building characters from the character segments.

Embodiments of the invention comprehend a variety of additional, optional, features. For example, preferably, the plurality of character segments take the form of various shapes such that alphanumeric characters are built from the character segments. The programmable endorser may be configured to print a linear endorsement composed of a sequence of characters. In a particular implementation, the programmable endorser further comprises a self-inking printing device composed of an elastomeric foam substrate material impregnated with a printing ink and faced with a selectively-permeable outer membrane so as to form a character segment when pressed against the document.

The self-inking printing device may take the form of a cylindrical, self-inking print roller. Further, the selectively-permeable outer membrane may have a surface divided into a plurality of chordal segments. Each chordal segment is configured to produce a character segment. Multiple chordal segments may be configured to produce the same character segment. A print hammer arrangement may be employed to press the document against the self-inking print roller to produce a character segment when desired. The cylindrical, self-inking print roller may be driven by a programmable rotary actuator. Various control mechanisms are possible.

Further, in carrying out the invention, although one approach provides a compact, desktop document processor, other approaches are not limited to desktop devices. In another embodiment of the invention, the apparatus comprises a feeder stage for receiving a check to be processed, and a transport stage including a plurality of processing devices. The transport stage conveys documents past the plurality of processing devices, and the processing devices perform operations on the documents.

In this embodiment, the transport stage receives a document from the feeder stage, and routes the document past the plurality of processing devices. The plurality of processing devices includes a programmable endorser for printing an endorsement on a document as the document is processed. The programmable endorser includes a plurality of character segments in the form of various shapes such that the endorsement is printed by building characters from the character segments.

In this embodiment, various additional, optional, features may also be included such as the self-inking printing device and programmable rotary actuator.

Still further, embodiments of the invention are not specifically limited to payment system devices. In yet another embodiment, an apparatus for capturing data from documents comprises a document processor for receiving a document to be processed. The document processor includes a plurality of processing devices and conveys documents past the plurality of processing devices to allow the processing devices to perform operations on the documents. The plurality of processing devices includes a programmable device for printing a message on a document as the document is processed. The programmable device includes a plurality of character segments in the form of various shapes such that the message is printed by building characters from the character segments.

DETAILED DESCRIPTION OF THE PREFERRED EMBODIMENTS

Figure 1:
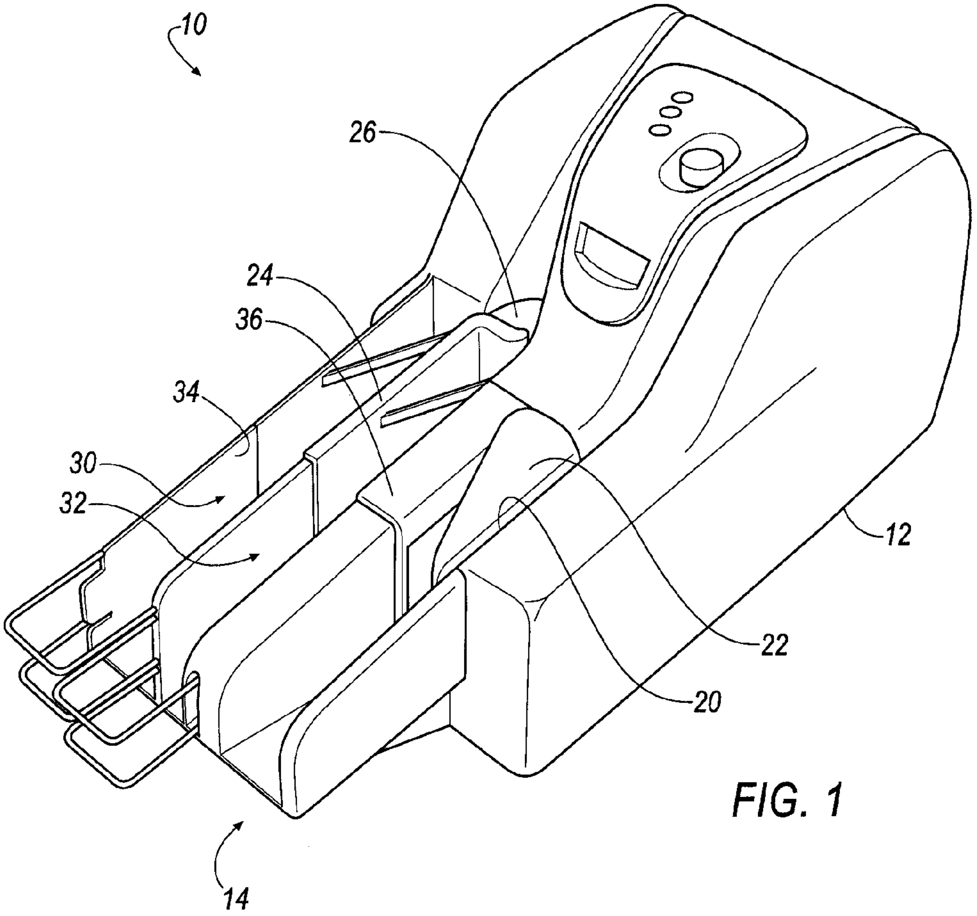
FIG. 1 illustrates a compact, desktop document processor in an embodiment of the invention.

As shown in FIG. 1, a compact, desktop document processor is generally indicated at 10. The apparatus 10 includes base unit 12, and input hopper 14 for receiving a batch of checks to be processed. In general, apparatus 10 is used for decentralized document processing applications. The input hopper 14 provides the operator with an area to place a stack of documents to be processed, supports longer documents, and assists with document alignment.

The apparatus 10 may be constructed to perform any number of known document processing actions as appreciated by one of ordinary skill in the art. Suitable electronics and mechanical mechanisms are located within base unit 12. For example, apparatus 10 may perform front and rear image capture, magnetic ink character recognition (MICR) reading, optical character recognition (OCR) reading, endorsing, and/or bar code reading depending on the application. Advantageously, the electronics and mechanical mechanisms required for the document processing actions are provided within base unit 12 as readily understood by one of ordinary skill in the art. The apparatus may be provided with a suitable network connection interface such as Ethernet or Universal Serial Bus (USB).

Input hopper 14 is an automatic, hands-off device that will feed a batch of checks into the base unit 12. Input hopper 14 receives and holds a batch of checks between side wall portion 20 and spring-loaded flag 22 which presses up against the last document in the loaded batch to keep the checks together. It is appreciated that apparatus 10 is suitable for processing checks as well as other financial and payment-related documents.

Divider element 24 includes a pocket selector 26 that allows checks to be sorted into, as shown, two pockets based on criteria such as high value amounts, image quality, reader rejects, and others. The pockets include first and second pockets 30 and 32, respectively. First pocket 30 is bound by side wall 34 of input hopper 14, and divider element 24. Second pocket 32 is bound by divider element 24 and wall 36.

Embodiments of the invention relate to providing a low-cost programmable endorsement on checks without the use of inkjet printing means. The apparatus 10 is an example of a document processor for which embodiments of the invention may be used to provide endorsement capability. Embodiments of the invention may also be implemented in other, smaller and cheaper devices, or in larger devices.

Accordingly, embodiments of the invention comprehend a novel, selectable printing means for endorsing checks which provides a real alternative to inkjet printing, and which can provide suitable alphanumeric endorsements at lower first cost, lower speed and at lower cost-of-ownership.

The illustrated embodiment is based in the technology of self-inking printing means, in which an elastomeric foam substrate material is impregnated with a printing ink, and then faced with a selectively-permeable outer membrane which is locally-pierced or otherwise made permeable to the ink within so as to form a message or other imprint to be printed when pressed against a material to be printed on, for example, paper. Workers will be familiar with this technology of self-inking stamps which are used for a variety of printing tasks. These are typically disposable printing means which are discarded when the self-contained supply of ink in the foam substrate is depleted, there being no practical way to replenish it.

Such self-inking stamps are typically capable of printing only a fixed message, which is formed by the selectively-permeable facing membrane. Embodiments of the invention contemplate the use of this technology in such a way as to create the ability to print almost any alphanumeric character or characters at will, and so to produce a linear endorsement upon a moveable paper item such as a check.

Figure 2:
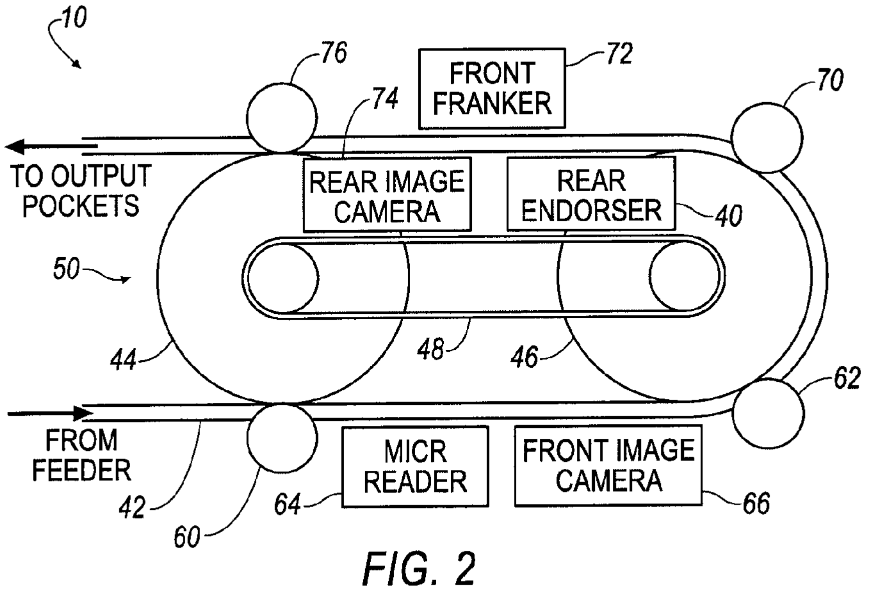
FIG. 2 illustrates a schematic view of the document processor, showing the rear endorser which includes the plurality of character segments for building characters.

With reference to FIG. 2, a schematic view of the apparatus 10 shows the rear endorser 40 which includes the plurality of character segments for building characters. In further detail, the apparatus 10 includes the document track 42 receiving documents from the input slot or feeder. When the document track 42 is energized, first and second drive rollers 44 and 46 connected by belt 48 for conveying the document through document track 42, begin to rotate. The transport stage 50 includes a plurality of processing devices. Transport stage 50 conveys the documents past the plurality of processing devices, with the processing devices performing operations on the documents, as further described below.

Upon feeding from the input slot or feeder, the document is captured between first drive roller 44 and pinch roller 60, and is driven forward. The document is then constrained to follow around drive roller 46 between drive roller 46 and pinch roller 62. At this time, magnetic ink character recognition (MICR) device 64 reads the MICR data off of the document. As well, front image camera 66 captures a front image of the passing document.

After the trailing edge of the document clears the MICR device 64, the data output from the MICR device 64 is processed to compose the programmable rear endorsement message for endorser 40.

As the document continues around drive roller 46 past pinch roller 70, the rear of the document is programmably endorsed by endorser 40. Following endorser 40, the document is franked by front franker 72 to prevent re-entry, and rear image camera 74 captures a rear image of the passing document as the document goes on to engage drive roller 44 and pinch roller 76, and exits the transport stage 50 as the document is routed to the output pocket or pockets.

In accordance with embodiments of the invention, the programmable endorser 40 includes a plurality of character segments in the form of various shapes such that the endorsement is printed by building characters from the character segments, as is further described below with reference primarily to FIGS. 3 and 4.

The invention, in one embodiment, comprehends a cylindrical, self-inking print roller for the endorser 40 (FIG. 2), with a selectively-permeable outer membrane provided on the cylindrical surface. This surface is divided into a number of equi-angular chordal segments, and each segment is made selectively-permeable in such a way as to produce a single character segment. FIG. 4 depicts the cylindrical, self-inking print roller at 90, with selectively permeable outer membrane 92. Chordal segments 94 each produce a single character segment or element.

Figure 3:
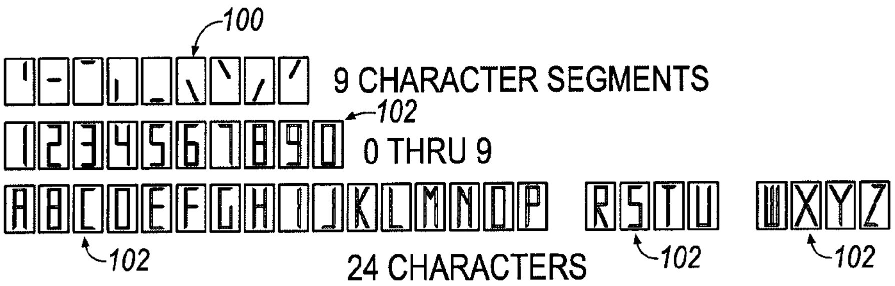
FIG. 3 illustrates 9 different character segments that when combined and correctly located, are capable of generating number and letter sets which are also illustrated.

As shown in FIG. 3, in the preferred embodiment, the roller contains 9 different character segments or elements 100, each meaningless by itself but capable, when combined with various of the other elements correctly located, of generating almost any alphanumeric character. The number and letter sets which are capable of being so generated from these 9 character segments are likewise shown in FIG. 3 at 102.

Referring again to FIG. 4, the print roller 90 is axially mounted to the shaft 110 of a programmable rotary actuator 112, which is capable of rotating shaft 110 through 360 degrees or more and may or may not be bi-directional. An indexing and aligning mechanism (not specifically shown) is provided between the roller 90 and the actuator 112, such that the angular location of any character segments/elements on the roller 90 is uniquely and fixedly aligned to the rotary position of the actuator 112, and any character element may thus be placed in a particular angular location by means of a programmable control of the actuator 112.

In the preferred embodiment, the rotary actuator 112 is a conventional electric stepper motor, but workers will understand that there are many other possibilities for the actuator 112. The print roller 90 is further constructed as to be removable from the actuator shaft 110 in such a manner as to make it disposable, to be replaced with an identically-constructed fresh roller when its internal ink supply is depleted.

Figure 4:
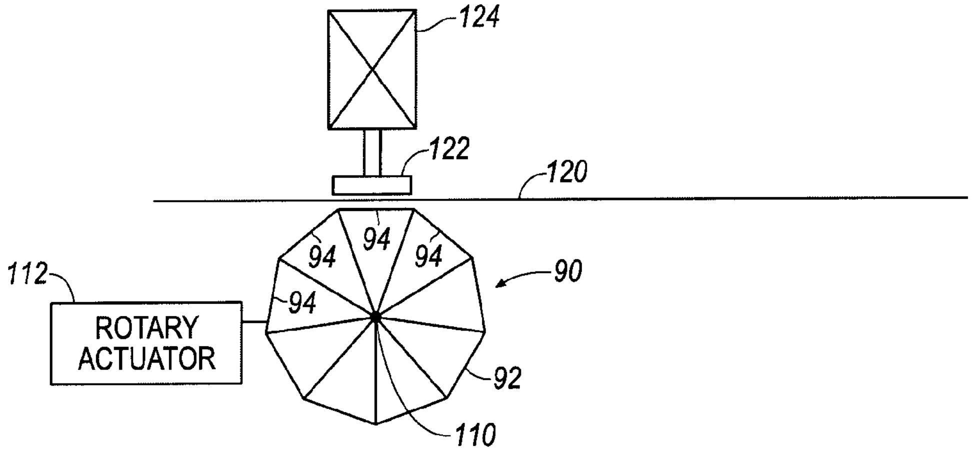
FIG. 4 illustrates an example of a self-inking print roller and associated print hammer.

With reference to FIG. 4, workers will therefore understand that a piece of paper 120, placed tangential to the print roller 90, can be sequentially printed with any one or more of the character elements embodied in the print roller 90. This is achieved by rotating the print roller 90 until the desired chordal segment/character element 94 is aligned to the paper 120, and then applying pressure to the back face of the paper 120 so as to press it against the print roller 90 and so transfer an impression of the character element 94 from the print roller 90 to the paper 120. Any character in the character set 102 (FIG. 3) shown can thus be built up by sequentially placing each required character element 94, 100 opposite the paper 120 and then pressing the paper 120 against the roller 90.

Workers will understand that there are a variety of suitable means for applying the print pressure described. A preferred embodiment employs a print hammer 122 operated by an electromagnetic solenoid 124, but such means as a rotary printing platen or a motor-driven eccentric print actuator would be equally apt for this application.

Workers will further understand that once a character has been generated from individual character elements by the methods described, if the paper 120 is then moved in a linear fashion to place an unprinted area in front of a print head, a second character can be printed, and so forth to create a line of printed characters.

Various different approaches can be employed to rotationally position the print wheel 90 so as to place the desired character element to be printed against the paper. For example, the print wheel 90 may always rotate in one direction with printing occurring the next time the desired character element is correctly placed. In the alternative, if a bi-directional rotary actuator is used, the next desired character element may be placed in the printing position by rotating the print wheel 90 in whichever direction is required to complete the motion more-quickly.

In another alternative, printing may be performed by rotating the print wheel 90 at a constant speed, or in a series of identical sequential steps, and applying print pressure only as each desired character element is next presented to the paper 120. This approach may have the advantage of simplified control of the rotary actuator, since it constantly performs the same step-wise motion and there is no requirement to continually calculate and program specific rotary motion increments. This approach, while simpler, is also likely to be slower to produce printed output, since the print roller 90 rotates continuously in a constant manner and its motions cannot be optimized to minimize the time spent rotating from one desired character element to the next.

In yet a further alternative, if space and other constraints permit, the print wheel 90 may be so constructed that each desired character element appears more than once on its circumference and/or that more frequently-used character elements appear more than once around the circumference, in each case increasing the number of available opportunities to print a desired character element in each rotation of the print wheel, and/or decreasing the angular motion required of the print wheel in order to reach the next desired character element. Workers will understand that there are many ways to optimize the basic printing approach, as size, cost, speed and complexity requirements may dictate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus, comprising:

a compact, desktop document processor base unit including an input slot for receiving a financial document and for capturing data from the financial document;

a transport stage located within the base unit, wherein the transport stage includes a plurality of processing devices, wherein the transport stage conveys the financial document past the plurality of processing devices such that the processing devices perform operations on the financial document; wherein the transport stage receives the financial document in the input slot and routes the financial document past the plurality of processing devices; wherein the plurality of processing devices includes a programmable endorser, wherein the programmable endorser includes:

a rotatable shaft rotatably-connected to the base unit, a self-inking printing device axially mounted upon the rotatable shaft, and a programmable rotary actuator connected to the rotatable shaft, wherein the programmable endorser is utilized for printing an endorsement on the financial document as the financial document is processed, wherein the self-inking printing device includes a plurality of character segments in the form of various shapes such that the endorsement is printed by building characters from the character segments.

2. The apparatus of claim 1 wherein the plurality of character segments are in the form of various shapes such that alphanumeric characters are built from the character segments.

3. The apparatus of claim 1 wherein the self-inking printing device includes an elastomeric foam substrate material impregnated with a printing ink and faced with a selectively-permeable outer membrane so as to form a character segment when pressed against the document.

4. The apparatus of claim 3 wherein the self-inking printing device comprises a cylindrical, self-inking print roller.

5. The apparatus of claim 4 wherein the selectively-permeable outer membrane has a surface divided into a plurality of chordal segments, each chordal segment being configured to produce a character segment.

6. The apparatus of claim 5, wherein the programmable rotary actuator is configured to drive the cylindrical, self-inking print roller.

7. The apparatus of claim 6 further comprising:

a control mechanism controlling the programmable rotary actuator to drive the cylindrical, self-inking print roller in one direction.

8. The apparatus of claim 6 further comprising:

a control mechanism controlling the programmable rotary actuator to drive the cylindrical, self-inking print roller bi-directionally.

9. The apparatus of claim 6 further comprising:

a control mechanism controlling the programmable rotary actuator to drive the cylindrical, self-inking print roller in one direction, at a constant speed.

10. The apparatus of claim 6 wherein the programmable rotary actuator comprises a stepper motor.

11. The apparatus of claim 1 wherein the programmable endorser is configured to print a linear endorsement composed of a sequence of characters.

12. The apparatus of claim 1 wherein the self-inking printing device includes a cylindrical, self-inking print roller composed of an elastomeric foam substrate material impregnated with a printing ink and faced with a selectively-permeable outer membrane so as to form a character segment when pressed against the financial document, wherein the selectively-permeable outer membrane has a surface divided into a plurality of chordal segments, wherein each chordal segment is configured to produce a character segment, wherein the apparatus further comprises a print hammer arranged to press the financial document against the self-inking print roller to produce a character segment upon the financial document.

13. The apparatus according to claim 12, wherein the apparatus further comprises an electromagnetic solenoid connected to the print hammer for actuating the print hammer for pressing the financial document against the self-inking print roller.

14. A subassembly of a compact, desktop document processor that receives a financial document and captures data from the financial document, comprising:

a programmable endorser, wherein the programmable endorser includes:

a rotatable shaft rotatably-connected to the base unit, a self-inking printing device axially mounted upon the rotatable shaft, and a programmable rotary actuator connected to the rotatable shaft, wherein the programmable endorser is utilized for printing an endorsement on the financial document as the financial document is processed, wherein the self-inking printing device includes a plurality of character segments in the form of various shapes such that the endorsement is printed by building characters from the character segments; and a document pressing device arranged communicatively arranged with the programmable endorser in a spaced-apart relationship, wherein the document pressing device includes:

a print hammer arranged to press the financial document against the self-inking print roller to produce a character segment upon the financial document, and an electromagnetic solenoid connected to the print hammer for actuating the print hammer for pressing the financial document against the self-inking print roller.

15. The subassembly of claim 14 wherein the plurality of character segments are in the form of various shapes such that alphanumeric characters are built from the character segments.

16. The subassembly of claim 14 wherein the self-inking printing device includes an elastomeric foam substrate material impregnated with a printing ink and faced with a selectively-permeable outer membrane so as to form a character segment when pressed against the document.

17. The subassembly of claim 16 wherein the self-inking printing device comprises a cylindrical, self-inking print roller.

18. The subassembly of claim 17 wherein the selectively-permeable outer membrane has a surface divided into a plurality of chordal segments, each chordal segment being configured to produce a character segment.

19. The subassembly of claim 18, wherein the programmable rotary actuator is configured to drive the cylindrical, self-inking print roller.

20. The subassembly of claim 19 further comprising:

a control mechanism controlling the programmable rotary actuator to drive the cylindrical, self-inking print roller in one direction.

21. The subassembly of claim 19 further comprising:

a control mechanism controlling the programmable rotary actuator to drive the cylindrical, self-inking print roller bi-directionally.

22. The subassembly of claim 19 further comprising:

a control mechanism controlling the programmable rotary actuator to drive the cylindrical, self-inking print roller in one direction, at a constant speed.

23. The subassembly of claim 19 wherein the programmable rotary actuator comprises a stepper motor.

24. The subassembly of claim 14 wherein the programmable endorser is configured to print a linear endorsement composed of a sequence of characters.

* * * * *